(12) United States Patent
Kokubo

(10) Patent No.: US 7,875,398 B2
(45) Date of Patent: Jan. 25, 2011

(54) FUEL CELL SYSTEM

(75) Inventor: Mitsuhiro Kokubo, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 863 days.

(21) Appl. No.: 11/169,641

(22) Filed: Jun. 30, 2005

(65) Prior Publication Data

US 2006/0014063 A1    Jan. 19, 2006

(30) Foreign Application Priority Data

Jul. 16, 2004    (JP) .............................. 2004-210493

(51) Int. Cl.
*H01M 8/06* (2006.01)
(52) U.S. Cl. ........................ 429/427; 429/407; 429/428; 429/430; 429/431; 429/432; 429/433; 429/442; 429/443; 429/448
(58) Field of Classification Search .................. 429/13, 429/21, 22, 23, 407, 427, 428, 430, 431, 429/432, 433, 442, 443, 448
See application file for complete search history.

(56) References Cited

U.S. PATENT DOCUMENTS

2004/0096713 A1 *   5/2004   Ballantine et al. .............. 429/23
2004/0161657 A1 *   8/2004   Simpson et al. ................ 429/38

FOREIGN PATENT DOCUMENTS

JP    10-326625 A    12/1998
JP    2003-331895 A    11/2003

* cited by examiner

*Primary Examiner*—Patrick Ryan
*Assistant Examiner*—Ben Lewis
(74) *Attorney, Agent, or Firm*—Foley & Lardner LLP

(57) ABSTRACT

A fuel cell system which includes: a fuel cell fed with a reaction gas for generating power; an output detection unit which detects output current and voltage of the fuel cell; a storage unit which stores a standard current-voltage characteristic of the fuel cell, from which a standard voltage of the fuel cell at an output current thereof is obtainable; and a gas feed mismatch detection unit which detects a gas feed mismatch of the reaction gas, based on a comparison between the detected output voltage of the fuel cell and the standard voltage at the detected output current, obtained from the standard current-voltage characteristic stored.

15 Claims, 4 Drawing Sheets

FUEL CELL SYSTEM

BACKGROUND OF THE INVENTION

1. Field of Invention

The present invention relates to a fuel cell system, particularly to a technology to optimize feed rate of fuel gas and oxidizer gas to a fuel cell in a fuel cell system.

2. Description of Related Art

Fuel cell is an electrochemical device which converts the chemical energy of a chemical reaction directly into electrical energy. A typical fuel cell consists of an electrolyte membrane and anode and cathode compartments sandwiching the electrolyte membrane therebetween, in which fuel gas is fed continuously to the anode compartment, oxidizer gas is fed continuously to the cathode compartment, and oxygen from the oxidizer gas and hydrogen contained in the fuel gas electrochemically reacts to generate electric power. The fuel cells are classified into alkaline fuel cell (AFC), phosphoric acid fuel cell (PAFC), molten carbonate fuel cell (MCFC), solid oxide fuel cell (SOFC) and polymer electrolyte fuel cell (PEFC), depending on the kind of electrolyte. Fuel cells of the latter two types are suitable as power sources for electric vehicles because of their solid electrolyte membranes easy in handling.

Generally, in the fuel cell used on ground level, air is used as the oxidizer gas. A typical air supply system of the fuel cell includes an air filter for removing dust contained in the air, a compressor for pressurizing the filtered air to a desired pressure, and pipings from the compressor to a fuel cell stack.

The air filter clogs due to a use in a dusty environment or a performance degradation of the compressor with passage of time induce an insufficient feed of reaction gas to the fuel cell, which causes lowering of an output voltage thereof. Also, the output voltage is lowered due to the change in the fuel cell stack itself with passage of time.

In the system shown in Japanese Patent Application Laid-Open Publication No. 2003-331895, a reference electrode is provided at an anode side of the electrolyte membrane, and by measuring an electrical potential difference between the reference electrode and the anode, a linear relation as a reference between the electrical potential difference and an output current is obtained. Then, the insufficient feed of reaction gas in the fuel cell is detected, when the relation between the electrical potential difference and the current measured during power generation deviates from the linear relation.

Japanese Patent Application Laid-Open Publication No. 10-326625 discloses a device in which when the output current of the fuel cell is drastically increased, the output current is limited to equal to or less than a current value corresponding to the reaction gas feed rate, and the reaction gas feed rate is controlled based on the current value thus limited.

SUMMARY OF THE INVENTION

However, problems as will be described hereunder are involved in the aforementioned system.

(1) In order to obtain the aforementioned linear relation, the electrical potential difference between the reference electrode and the anode is measured for every control, and therefore a time lag occurs before the power generation is brought into a normal state.

(2) The reference electrode is arranged within the fuel cell stack, thereby complicating a stack structure.

(3) The aforementioned linear relation is defined and the insufficient feed of reaction gas is detected, on the condition that the potential of the reference electrode is maintained at a given level, and therefore when the potential of the reference electrode is deviated, the gas feed rate is excessively increased or the output current is limited, based on an erroneous estimation.

(4) When power generating performance of a cell is reduced due to deterioration in electrode catalyst or ion conductivity or the like of the electrolyte membrane with passage of time, the electrical potential difference and the current measured during power generation does not satisfy the aforementioned linear relation, even if the supply of the reactive gas is increased. In this case, gas exhaust not contributing to the power generating reaction is increased, whereby the power generation efficiency of the fuel cell is reduced.

The present invention is made in the light of the problems. An object of the present invention is to provide a fuel cell system capable of securely detecting insufficient or excessive feed of the reaction gas to the fuel cell, and a gas feed mismatch in which the actual ratio of oxidizer gas to fuel gas deviates from a control stoichiometric ratio (a required reaction gas excess coefficient) thereof.

An aspect of the present invention is a fuel cell system, comprising: a fuel cell to be fed with a reaction gas for generating power; an output detection unit which detects an output current and an output voltage of the fuel cell; a storage unit which stores a standard current-voltage characteristic of the fuel cell, from which a standard voltage of the fuel cell at an output current thereof is obtainable; and a gas feed mismatch detection unit which detects a gas feed mismatch of the reaction gas, based on a comparison between the output voltage of the fuel cell detected by the output detection unit, and the standard voltage at the output current detected by the output detection unit, obtained from the standard current-voltage characteristic stored in the storage unit.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
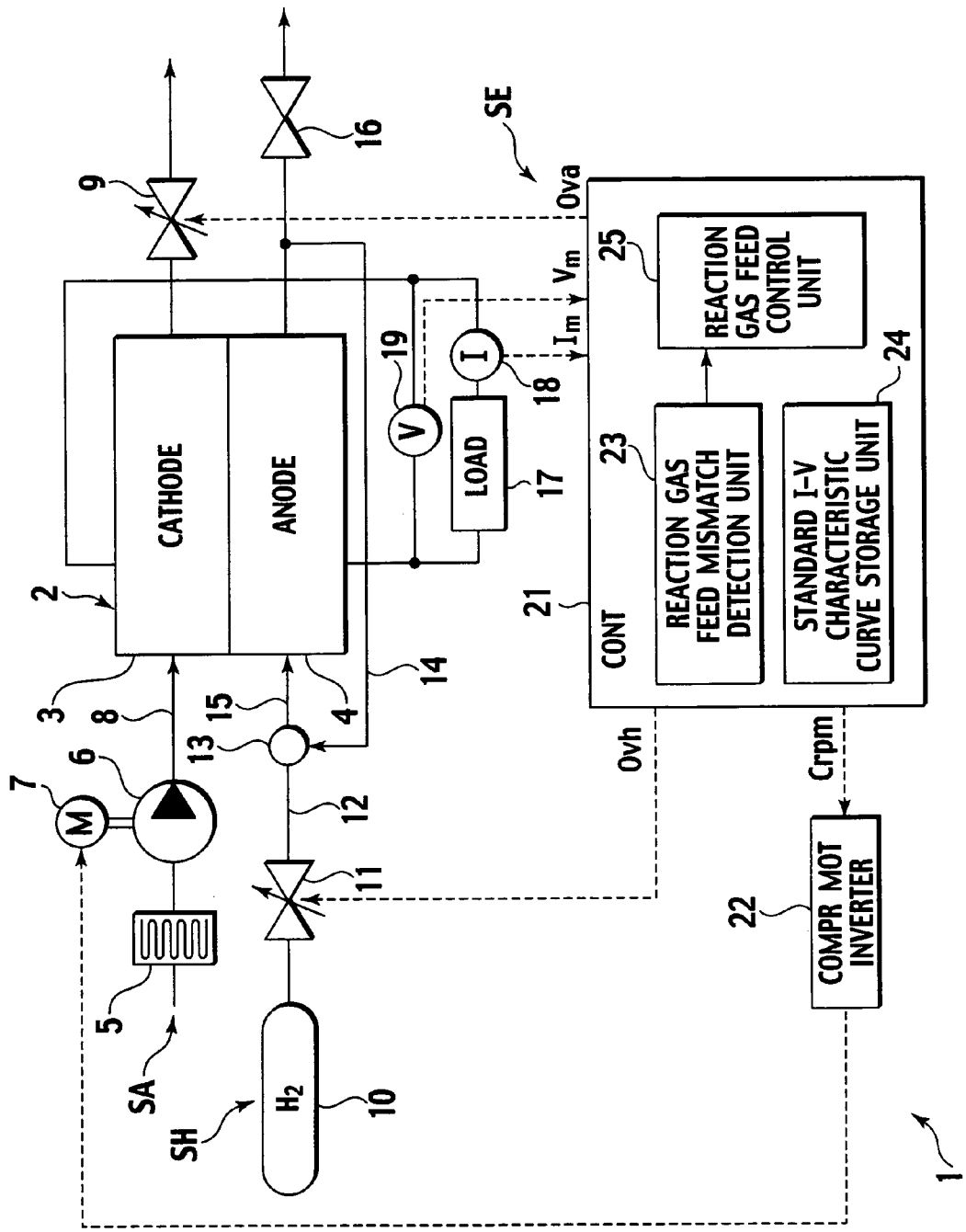
FIG. 1 is a system block diagram of a fuel cell system according to an embodiment of the present invention.

An embodiment of the present invention will be explained below with reference to the drawings, wherein like members are designated by like reference characters. In the description hereunder, explanation will be given to an example of applying the present invention to a solid polymer fuel cell. However, the present invention is not limited thereto, and can be applied to other types of fuel cells, such as a solid oxide fuel cell.

As shown in FIG. 1, a fuel cell system 1 includes a fuel cell 2, an air supply system SA for supplying air as an oxidizer gas to a cathode 3 of the fuel cell 2, a hydrogen gas supply system SH for supplying hydrogen gas as a fuel gas to an anode 4 of the fuel cell 2, a load 17, and an instrumentation and control system SE.

The fuel cell 2 is a solid polymer fuel cell which generates power through an electrochemical reaction between oxygen in the air supplied to the cathode 3 and hydrogen gas supplied to the anode 4 as reaction gases. The generated power is supplied to the load 17.

The instrumentation and control system SE includes a current meter 18 for detecting an output current to the load 17 from the fuel cell 2, a volt meter 19 for detecting an output voltage of the fuel cell 2, a controller 21, and a compressor motor inverter 22.

The air supply system SA includes an air filter 5, a compressor 6 for pressurizing the filtered air, a compressor motor 7 for driving the compressor 6, an air supply path 8 for guiding the air to the cathode 3 from the compressor 6, and an air pressure regulation valve 9 provided downstream of the cathode 3 to regulate air pressure of the system.

The air filter 5 removes dust and chemical impurities from the air sucked into the compressor 6. The compressor 6, being rotationally driven by the compressor motor 7, pressurizes a filtered air, and supplies the pressurized air to the cathode 3. A rotation speed of the motor 7 is controlled by changing a frequency of an alternating current to be supplied to the motor 7, using a compressor motor inverter 22.

The hydrogen gas supply system SH includes a hydrogen container 10 for storing hydrogen gas, a hydrogen gas pressure regulation valve 11 for regulating a supply pressure of the hydrogen gas to the anode 4, an ejector 13, a hydrogen gas supply path 12 connecting the hydrogen gas pressure regulation valve 11 and a nozzle of the ejector 13, a hydrogen gas supply path 15 connecting a discharge port of the ejector 13 and the anode 4 of the fuel cell 2, a hydrogen gas circulation path 14 connecting an outlet of the anode 4 and a suction port of the ejector 13, and a purge valve 16 provided near the outlet of the anode 4 of the hydrogen gas circulation path 14.

The hydrogen gas is supplied to the nozzle of the ejector 13 as a drive gas from the hydrogen container 10, for which a high pressure hydrogen tank and a hydrogen absorbing material tank are used, through the hydrogen gas pressure regulation valve 11 and the hydrogen gas supply path 12. The ejector 13 functions as a fluid pump to merge hydrogen gas supplied to the nozzle to an anode off-gas discharged from the anode 4 and flowing through the hydrogen gas circulation path 14, and supplies the mixture gas to the anode 4 through the hydrogen gas supply path 15. The purge valve 16 is to be opened when a part of the anode off-gas is discharged outside the system. Thus, nitrogen and liquid water and so forth accumulated in a hydrogen gas circulation passage including the anode 4 and the hydrogen gas circulation path 14 are discharged outside the system.

Note that the fuel cell system 1 may have a humidifier for humidifying hydrogen gas and air, or a cooling system for cooling the fuel cell 2.

The controller 21 includes a gas feed mismatch detection unit 23, a standard current-voltage characteristic storage unit 24, and a gas feed control unit 25.

The standard current-voltage characteristic storage unit 24 stores data of a standard current-voltage characteristic (referred to as standard I-V characteristic curve hereafter) which is a relation between an output current and an output voltage of the fuel cell 2 when feed rates of the reaction gases to the fuel cell 2 are proper. The gas feed mismatch detection unit 23 reads a current value (actual measurement current value) Im (A) and a voltage value (actual measurement voltage value) Vm (V) of the fuel cell 2 measured by a current meter 18 and a voltage meter 19, which are output detection units of the fuel cell 2, obtains a standard voltage value Vs (V) at the actual measurement current value Im from a standard I-V characteristic curve of the standard current-voltage characteristic storage unit 24, and detects a gas feed mismatch of the reaction gas based on a comparison between the standard voltage value Vs and an actual measurement voltage value Vm.

The gas feed control unit 25 increases or decreases the reaction gas feed rate, based on a comparison result between the standard voltage value Vs and the actual measurement voltage value Vm, when the reaction gas feed mismatch is detected by the gas feed mismatch detection unit 23.

In this case, an air feed rate is controlled by regulating the rotation speed of the compressor 6 and a valve opening degree of the air pressure regulation valve 9. Meanwhile, a hydrogen gas feed rate is controlled by regulating the valve opening degree of the hydrogen gas pressure regulation valve 11. The controller 21 sends a command of the rotation speed of the compressor 6 to the compressor motor inverter 22, and the valve opening degrees of the air pressure regulation valve 9 and the hydrogen gas pressure regulation valve 11.

In order to control feed rates of the air and the hydrogen gas, the gas feed control unit 25 stores a correspondence table which gives compressor rotation speeds required for various air flow rates, and a correspondence table which gives the valve opening degrees of the hydrogen gas pressure regulation valve required for various hydrogen gas flow rates.

Further, the controller 21 is not to be limited, but is constituted of a microprocessor including a CPU, a program ROM, an operation RAM, and an input/output interface, in this embodiment.

The fuel cell system 1 thus constituted may have the air filter 5 clogged when used in an environment where dust is generated in large amount, or the fuel cell system 1 may be used in an environment where an atmospheric pressure is low such as a high altitude area, with the compressor 6 and the pressure regulation valves 9 and 11 deteriorated with passage of time. In this case, the feed rate of the reaction gas is decreased, and the output voltage of the fuel cell 2 becomes lower than the standard voltage value obtained from the standard I-V characteristic curve.

In this case, the controller 21 detects a gas feed mismatch of the reaction gas, based on detection signals Im and Vm of the current meter 18 and the voltage meter 19, and the standard I-V characteristic of the fuel cell 2 stored in the standard current-voltage characteristic storage unit 24, and controls supply of the reaction gas so as to eliminate the mismatch.

Figure 2:
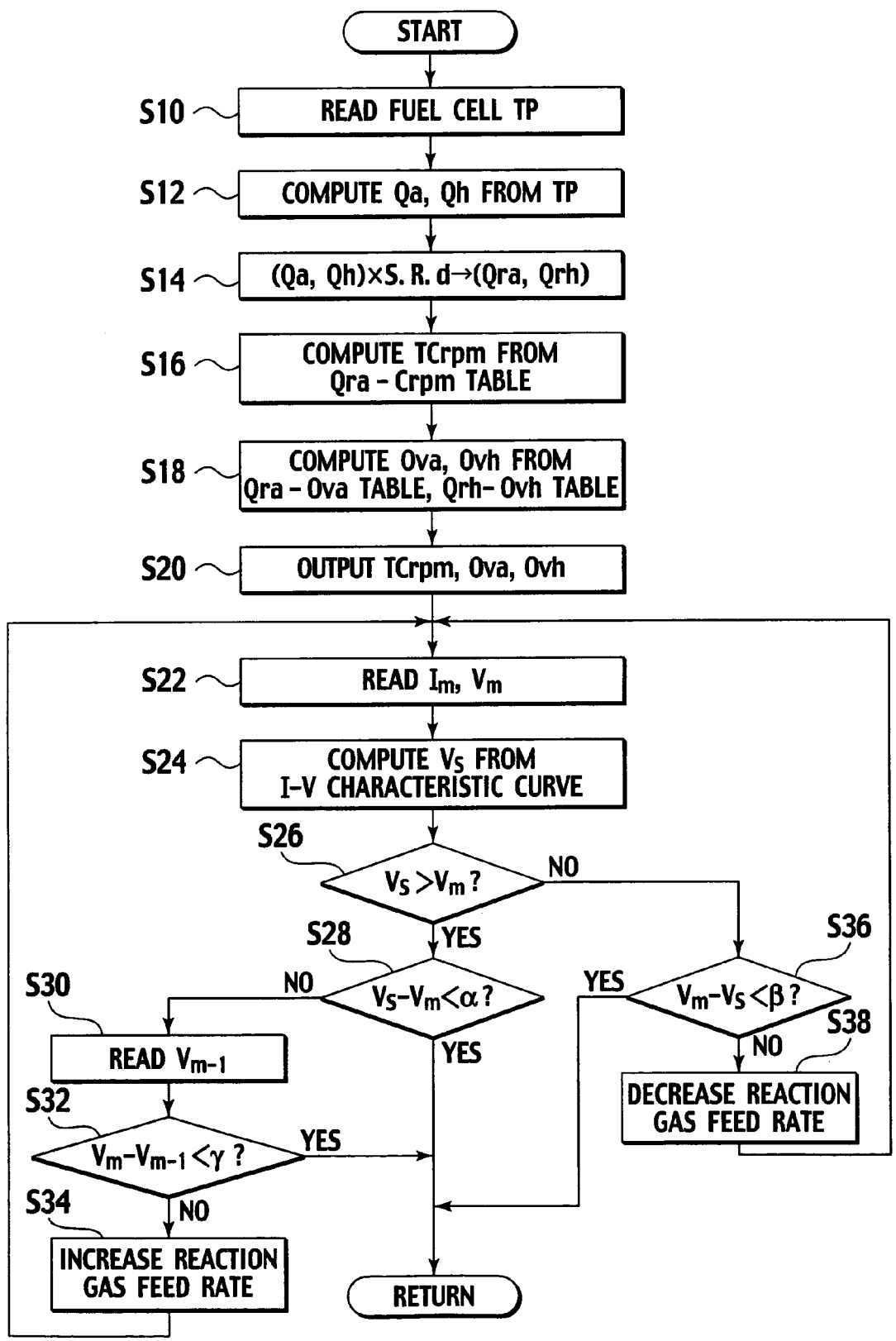
FIG. 2 is a flow chart of gas feed mismatch detection and gas feed rate control in the embodiment.

Next, a gas feed mismatch detection and a gas feed rate control by the controller 21 will be explained with reference to a flow chart of FIG. 2. Note that the control shown in this flow chart is executed repeatedly every predetermined time (for example, of 50 (mS)), after starting the fuel cell system 1.

First, in step 10 (abbreviated as S hereafter), the controller 21 reads a target output power TP required for the fuel cell 2 to generate. Next, in S12, the controller 21 computes reaction gas flow rates (mass flow rates) Qh and Qa of the hydrogen gas and the air for generating the required output power TP. The reaction gas flow rates Qh and Qa are computed by obtaining the reaction gas flow rate per unit time from the current required for the fuel cell and the Faraday constant.

In S14, the controller 21 computes a required gas flow rate (required air flow rate Qra and required hydrogen gas flow rate Qrh), by multiplying the reaction gas flow rates Qh and Qa thus computed by a control stoichiometric ratio S.R.d (reaction gas excess coefficient such as 1.7).

In S16, the controller 21 refers to the correspondence table (Qra-Crpm TABLE) of a required air flow rate Qra and a compressor rotation speed Crpm, and computes a target rotation speed TCrpm of the compressor 6. Next, in S18, the controller 21 refers to the correspondence table (Qra-Ova TABLE) of a required air flow rate Qra and the valve opening degree of an air pressure regulation valve Ova, and the correspondence table (Qrh-Ovh TABLE) of a required hydrogen gas flow rate Qrh and the valve opening degree of a hydrogen gas pressure regulation valve Ovh, and computes the valve opening degrees Ova and Ovh of the air pressure regulation valve 9 and the hydrogen gas pressure regulation valve 11, respectively.

Next, in S20, the controller 21 outputs the compressor target rotation speed TCrpm to the compressor motor inverter 22, and the valve opening degrees Ova and Ovh are outputted respectively to the air pressure regulation valve 9 and the hydrogen gas pressure regulation valve 11.

Next, in S22, the controller 21 reads the actual measurement current value Im and the actual measurement voltage value Vm of the fuel cell, from the current meter 18 and the voltage meter 19. Next, in S24, the controller 21 computes the standard voltage value Vs corresponding to the actual measurement current value Im, based on the standard I-V characteristic curve stored in the standard current-voltage characteristic storage unit 24. Then, in S26, whether or not the actual measurement voltage value Vm is lower than the standard voltage value Vs is determined.

In S26, when the standard voltage value Vs is determined to be larger than the actual measurement voltage value Vm (Vs>Vm), the reaction gas feed rate is determined to be insufficient, and processing is advanced to S28. In S26, when the standard voltage value Vs is determined to be smaller than the actual measurement voltage value Vm (Vs≦Vm), the reaction gas feed rate is determined to be not insufficient, and the processing is advanced to S36.

Figure 3:
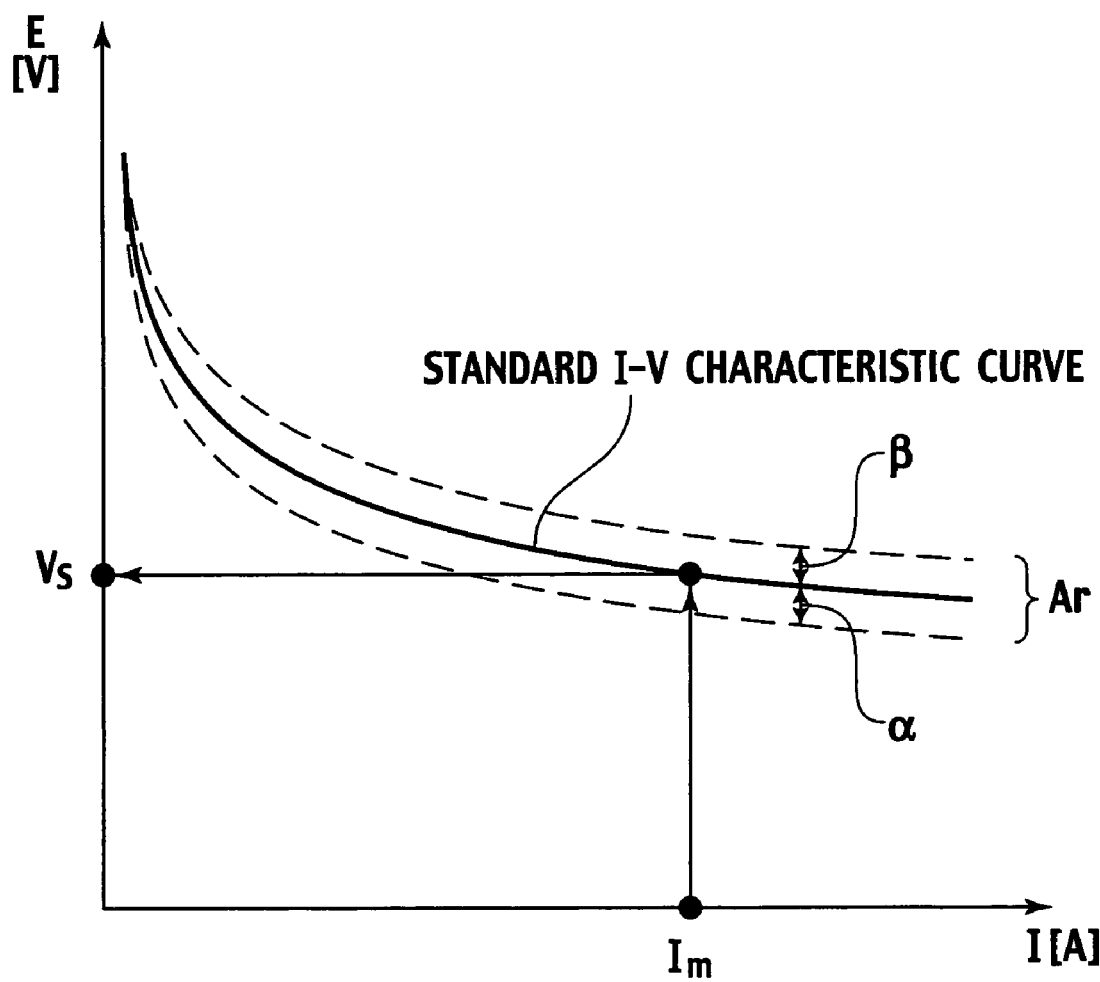
FIG. 3 shows an example of a standard current-voltage characteristic curve of a fuel cell.

In S28, in order to determine the extent of lowering of the actual measurement voltage Vm from the standard voltage value Vs, it is determined whether or not a difference between the standard voltage value Vs and the actual measurement voltage value Vm (Vs−Vm) is smaller than a predetermined value α. The predetermined value α may be a fixed percentage (for example, 15%) of the standard voltage value Vs, or in the same way as the standard I-V characteristic, the predetermined value α for the predetermined current value may be previously stored in the standard current-voltage characteristic storage unit 24 and read as needed, and also the predetermined value α is not limited to the actual measurement current value, and may be a fixed value as a simple method (see FIG. 3).

In S28, when the difference between the standard voltage value Vs and the actual measurement voltage value Vm (Vs−Vm) is determined to be smaller than the predetermined value α, the controller 21 does not increase or decrease the reaction gas feed rate and the processing is returned to a start, because the actual measurement voltage value Vm is within an allowable range Ar.

In S28, when the difference between the standard voltage value Vs and the actual measurement voltage value Vm (Vs−Vm) is determined to be equal to or more than the predetermined value α, it is determined that the actual measurement voltage value Vm does not reach the allowable range Ar, and the processing is advanced to S30. In S30, the controller 21 reads the actual measurement voltage value $V_{m-1}$ measured and stored in the previous processing, and in S32, it is determined whether or not increase rate or difference of the actual measurement voltage $\Delta$Vm (Vm−$V_{m-1}$) is smaller than a predetermined value γ. The predetermined value γ is a parameter used for suppressing an increase in an excessive reaction gas feed rate, when the actual measurement voltage value Vm is not increased even when the reaction gas feed rate is increased, due to the deterioration in the electrode catalyst and the electrolyte membrane of the fuel cell 2. The predetermined value γ can vary depending on the structure of the fuel cell, a material of the electrode catalyst, a material of the electrolyte membrane, and an operation condition of the fuel cell, and is therefore experimentally obtained in advance and stored in the controller 21.

In S32, when the increase rate $\Delta$Vm of the actual measurement voltage value is determined to be smaller than the predetermined value γ, the controller 21 does not increase/decrease the reaction gas feed rate, and the processing is returned to the start. In S32, when $\Delta$Vm is determined to be equal to or more than the predetermined value γ, the actual measurement voltage value Vm is possibly within the allowable range Ar by increasing the reaction gas feed rate, and the processing is advanced to S34. In S34, the controller 21 increases the reaction gas feed rate by a fixed increase amount $\Delta$SR of a stoichiometric ratio (for example, 0.1 of stoichiometric ratio) by increasing rotation speed Crpm of the compressor 6 and valve opening degree Ovh of the hydrogen gas pressure regulation valve 11, and then the processing is returned to S22. Thus, in this embodiment, when the reaction gas feed is determined to be insufficient, the reaction gas feed rate is increased, and an output power of the fuel cell 2 is recovered. Therefore, power generation efficiency of the fuel cell 2 can be maintained.

In S36, the controller 21 determines whether or not the difference (Vm−Vs) between the actual measurement voltage value Vm and the standard voltage value Vs is smaller than a predetermined value β, so as to judge how much the actual measurement voltage value Vm excesses from the standard voltage value Vs. The predetermined value β may be a fixed percentage (for example, 15%) of the standard voltage value Vs, or in the same way as the standard I-V characteristic, the predetermined value β for the predetermined current value may be previously stored in the standard current-voltage characteristic storage unit 24 and read as needed, and also the predetermined value β is not limited to the actual measurement current value, and may be a fixed value as a simple method (see FIG. 3).

In S36, when the difference (Vm−Vs) between the actual measurement voltage value Vm and the standard voltage value Vs is determined to be smaller than the predetermined value β, the actual measurement voltage value Vm is within the allowable range Ar. Therefore, the processing is returned to the start, without decreasing the reaction gas feed rate. In judgment of S36, if the difference (Vm−Vs) between the actual measurement voltage value Vm and the standard voltage value Vs is equal to or more than the predetermined value β, the processing is advanced to S38. In S38, the controller 21 increases the reaction gas feed rate by a fixed increase amount $\Delta$SR of a stoichiometric ratio (for example, 0.1 of stoichiometric ratio) by increasing rotation speed Crpm of the compressor 6 and valve opening degree Ovh of the hydrogen gas pressure regulation valve 11, and then the processing is returned to S22. Thus, in this embodiment, when the reaction gas is determined to be excessively supplied, the reaction gas feed rate is decreased. Therefore, the fuel cell system 1 is capable of maintaining and enhancing the power generation efficiency thereof, without wastefully consuming power by the compressor's excessive feed of air.

Figure 4:
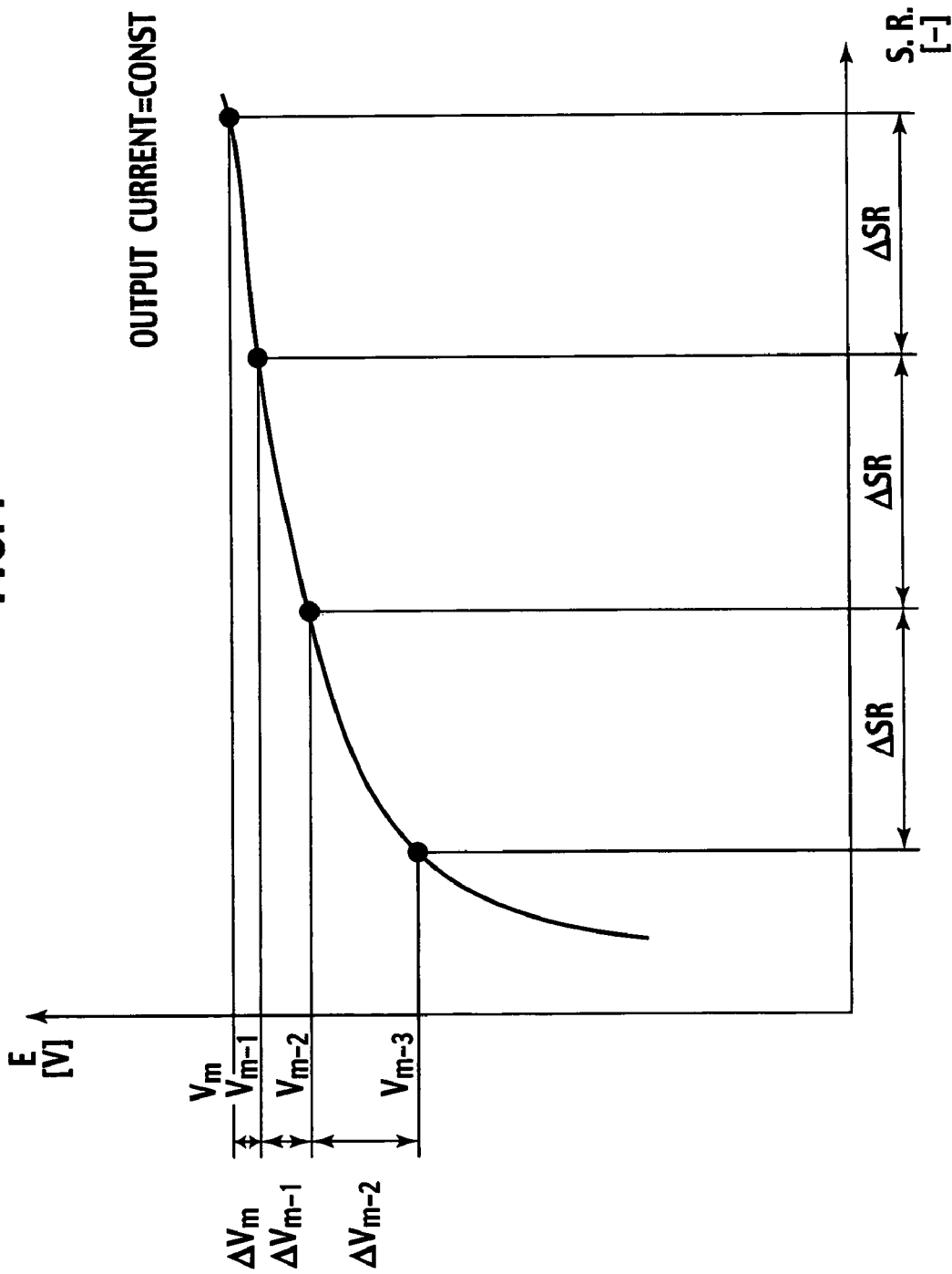
FIG. 4 shows an example of decreasing rate of voltage rise against the increase in a reaction gas feed by a predetermined amount, when power generating performance of the fuel cell is lowered due to deterioration or the like in an electrode catalyst and an electrolyte membrane thereof.

FIG. 4 shows that when the electrode catalyst and the electrolyte membrane of the fuel cell 2 are deteriorated, the actual measurement voltage value Vm is not increased by more than a fixed rate, even when the reaction gas feed rate is increased by every $\Delta$SR of stoichiometric ratio, under a condition of constant output current.

For example, when the actual measurement voltage value measured in S22 (FIG. 2) of an initial processing $V_{m-3}$ is smaller than the standard voltage value Vs (not shown) due to the lowering of the actual stoichiometric ratio S.R.a caused by the deterioration of the compressor and the clogging of the air filter, the controller 21 controls so that the reaction gas feed rate is increased by a fixed increase amount $\Delta$SR of the stoichiometric ratio in S34 after S24, S26, S28, S30, and S32. Then, the processing is returned to S22, and the output voltage is measured again. It is found in a second processing that the actual measurement voltage value $V_{m-2}$ is increased from the actual measurement voltage value $V_{m-3}$ of the initial processing by $\Delta V_{m-2}$. Thereafter, in a similar manner, measurement of the increase in the reaction gas feed rate and the output voltage is repeated, to obtain the actual measurement voltage value $V_{m-1}$ of a third processing and the actual measurement voltage value $V_m$ of a fourth processing. The actual measurement voltage value $V_{m-1}$ of the third processing is increased from the actual measurement voltage value $V_{m-2}$ of the second processing by $\Delta V_{m-1}$, and the actual measurement voltage value $V_m$ of the fourth processing is increased from the actual measurement voltage value $V_{m-1}$ of the third processing by $\Delta V_m$. The rates of voltage increase $\Delta V_{m-2}$, $\Delta V_{m-1}$, and $\Delta V_m$ become smaller, as the gas feed rate is increased by $\Delta$SR of the stoichiometric ratio.

When the decrease in the actual measurement voltage value is not caused by the deficiency in the reaction gas feed (for example, decrease in the actual stoichiometric ratio S.R.a, due to deterioration in the compressor and clogging of the air filter or the like), but caused by the deterioration in the fuel cell itself such as deterioration in the electrode catalyst and the electrolyte membrane, the actual measurement voltage value $V_m$ does not reach the allowable range Ar of the voltage value, in many cases, due to the decrease in the voltage increase rate, even if the reaction gas feed rate is increased as much as the system allows.

In this embodiment, it is determined in S32 (FIG. 2) whether or not the voltage increase rate $\Delta V_m$ ($V_m - V_{m-1}$) from the actual measurement voltage value $V_{m-1}$ of the preceding processing to the actual measurement voltage $V_m$ of the present processing after increasing the reaction gas feed rate is below the predetermined value γ is determined. In S32, when the voltage increase rate $\Delta V_m$ is determined to be below the predetermined value γ, ($\Delta V_m < γ$), the increase of the reaction gas feed rate is terminated even when the actual measurement voltage value does not reach the allowable range Ar.

Thus, when the decrease in the voltage value is caused by the deterioration in the fuel cell itself and not caused by the insufficient feed of the reaction gas, differently from a case in which the increase in the reaction gas feed rate is controlled to be terminated only when the actual measurement voltage value $V_m$ is within the allowable range Ar, it becomes possible to prevent that the reaction gas is excessively supplied, the driving power of the compressor is wastefully increased, and the power generation efficiency of the fuel cell is reduced.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-210493, filed on Jul. 16, 2004, the disclosure of which is expressly incorporated herein by reference in its entirety.

What is claimed is:

1. A fuel cell system, comprising:
   a fuel cell configured to be fed with a reaction gas and generate electric power at a predetermined required output power;
   a reaction gas supply system configured to feed the reaction gas to the fuel cell at a feed rate;
   an output detection unit configured to detect an output current and an output voltage of the fuel cell;
   a storage unit which stores a standard current-voltage characteristic of the fuel cell, from which a standard voltage of the fuel cell at a given output current thereof is obtainable;
   a gas feed mismatch detection unit configured to detect a gas feed mismatch of the reaction gas, based on a comparison between the output voltage of the fuel cell detected by the output detection unit, and the standard voltage at the output current detected by the output detection unit, obtained from the standard current-voltage characteristic stored in the storage unit; and
   a gas feed control unit configured to control the gas feed of the reaction gas supply system,
   wherein the gas feed control unit is configured to change the feed rate of the reaction gas from a first feed rate to a second feed rate, according to a result of the comparison between the standard voltage and the detected output voltage, when the gas feed mismatch of the reaction gas is detected by the gas feed mismatch detection unit,
   wherein the first feed rate is determined as a first function of a product of the predetermined required output power and a first control stoichiometric ratio, and the second feed rate is determined as a second function of a product of the predetermined required output power and a second control stoichiometric ratio, and
   wherein the gas feed control unit is configured to change the feed rate from the first feed rate to the second feed rate under a condition that the power generated by the fuel cell fed with the reaction gas at the first feed rate and the power generated by the fuel cell fed with the reaction gas at the second feed rate are maintained at the predetermined required output power.

2. The fuel cell system according to claim 1, wherein the gas feed control unit is configured to decrease the feed rate of the reaction gas and bring the detected output voltage within a predetermined range based on the standard voltage, when the detected output voltage is higher than an upper limit of the predetermined range.

3. The fuel cell system according to claim 1, wherein the gas feed control unit is configured to increase the feed rate of the reaction gas and bring the detected output voltage within a predetermined range based on the standard voltage, when the detected output voltage is lower than a lower limit of the predetermined range.

4. The fuel cell system according to claim 3, wherein the gas feed control unit is configured to stop increasing the feed rate of the reaction gas even when the detected output voltage of the fuel cell is outside the predetermined range, when a rate of increase in the detected output voltage for an increase in the feed rate of the reaction gas by a predetermined amount is lower than a predetermined value.

5. The fuel cell system according to claim 1, wherein the first control stoichiometric ratio and the second control stoichiometric ratio are different.

6. The fuel cell system according to claim 1, wherein the first and second control stoichiometric ratios are reaction gas excess coefficients.

7. The fuel cell system according to claim 1, wherein the first feed rate has a first fuel gas flow amount and a first oxidizer gas flow amount, and the second feed rate has a second fuel gas flow amount different from the first fuel gas flow amount and a second oxidizer gas flow amount different from the first oxidizer gas flow amount.

8. A method of operating a fuel cell system including a fuel cell which is fed with a reaction gas and generates electric power at a predetermined required output power, the method comprising:

feeding the reaction gas to the fuel cell at a feed rate;

storing a standard current-voltage characteristic of the fuel cell, from which a standard voltage of the fuel cell at a given output current thereof is obtainable;

detecting an output current and an output voltage of the fuel cell;

obtaining the standard voltage at the detected output current from the standard current-voltage characteristic;

comparing the detected output voltage with the standard voltage at the detected output current;

detecting a gas feed mismatch of the reaction gas, based on the comparison between the detected output voltage and the standard voltage at the detected output current; and changing the feed rate of the reaction gas from a first feed rate to a second feed rate, according to a result of the comparison between the standard voltage and the detected output voltage, when the gas feed mismatch of the reaction gas is detected, wherein the first feed rate is determined as a first function of a product of the predetermined required output power and a first control stoichiometric ratio, and the second feed rate is determined as a second function of a product of the predetermined required output power and a second control stoichiometric ratio, and wherein the changing of the feed rate of the reaction gas from the first feed rate to the second feed rate is made under a condition that the power generated by the fuel cell fed with the reaction gas at the first feed rate and the power generated by the fuel cell fed with the reaction gas at the second feed rate are maintained at the predetermined required output power.

9. The method of operating a fuel cell system according to claim 8, wherein the first control stoichiometric ratio and the second control stoichiometric ratio are different.

10. The method of operating a fuel cell system according to claim 8, wherein the first and second control stoichiometric ratios are reaction gas excess coefficients.

11. The method of operating a fuel cell system according to claim 8, wherein the first feed rate has a first fuel gas flow amount and a first oxidizer gas flow amount, and the second feed rate has a second fuel gas flow amount different from the first fuel gas flow amount and a second oxidizer gas flow amount different from the first oxidizer gas flow amount.

12. A fuel cell system, comprising:

a fuel cell configured to be fed with a reaction gas and generate electric power at a predetermined required output power;

a reaction gas supply means for feeding the reaction gas to the fuel cell at a feed rate;

output detection means for detecting an output current and an output voltage of the fuel cell;

a storage means for storing a standard current-voltage characteristic of the fuel cell, from which a standard voltage of the fuel cell at a given output current thereof is obtainable;

a gas feed mismatch detection means for detecting a gas feed mismatch of the reaction gas, based on a comparison between the output voltage of the fuel cell detected by the output detection means, and the standard voltage at the output current detected by the output detection means, obtained from the standard current-voltage characteristic stored in the storage means; and a gas feed control means for controlling the gas feed of the reaction gas supply means, wherein the gas feed control means is configured to change the feed rate of the reaction gas from a first feed rate to a second feed rate, according to a result of the comparison between the standard voltage and the detected output voltage, when the gas feed mismatch of the reaction gas is detected by the gas feed mismatch detection means, wherein the first feed rate is determined as a first function of a product of the predetermined required output power and a first control stoichiometric ratio, and the second feed rate is determined as a second function of a product of the predetermined required output power and a second control stoichiometric ratio, and wherein the gas feed control means is configured to change the feed rate from the first feed rate to the second feed rate under a condition that the power generated by the fuel cell fed with the reaction gas at the first feed rate and the power generated by the fuel cell fed with the reaction gas at the second feed rate are maintained at the predetermined required output power.

13. The fuel cell system according to claim 12, wherein the first control stoichiometric ratio and the second control stoichiometric ratio are different.

14. The fuel cell system according to claim 12, wherein the first and second control stoichiometric ratios are reaction gas excess coefficients.

15. The fuel cell system according to claim 12, wherein the first feed rate has a first fuel gas flow amount and a first oxidizer gas flow amount, and the second feed rate has a second fuel gas flow amount different from the first fuel gas flow amount and a second oxidizer gas flow amount different from the first oxidizer gas flow amount.

* * * * *